(12) United States Patent
Essaki et al.

(10) Patent No.: US 10,468,669 B2
(45) Date of Patent: Nov. 5, 2019

(54) ACTIVE MATERIAL FOR NONAQUEOUS ELECTROLYTE BATTERY, ELECTRODE FOR NONAQUEOUS ELECTROLYTE BATTERY, NONAQUEOUS ELECTROLYTE SECONDARY BATTERY AND BATTERY PACK

(71) Applicant: Kabushiki Kaisha Toshiba, Minato-ku (JP)

(72) Inventors: Kenji Essaki, Kanagawa-ken (JP); Takayuki Fukasawa, Kanagawa-ken (JP); Miho Muramatsu, Kanagawa-ken (JP); Tomokazu Morita, Chiba-ken (JP); Takashi Kuboki, Tokyo (JP); Yumiko Kita, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 671 days.

(21) Appl. No.: 14/956,494

(22) Filed: Dec. 2, 2015

(65) Prior Publication Data

US 2016/0164076 A1 Jun. 9, 2016

(30) Foreign Application Priority Data

Dec. 5, 2014 (JP) ................................ 2014-247139

(51) Int. Cl.
*H01M 4/36* (2006.01)
*H01M 4/38* (2006.01)
(Continued)

(52) U.S. Cl.
CPC ........... *H01M 4/364* (2013.01); *H01M 4/366* (2013.01); *H01M 4/386* (2013.01); *H01M 4/583* (2013.01);
(Continued)

(58) Field of Classification Search
CPC ...... H01M 4/364; H01M 4/366; H01M 4/386; H01M 4/583; H01M 10/0525
See application file for complete search history.

(56) References Cited

U.S. PATENT DOCUMENTS

2003/0215711 A1  11/2003  Aramata et al.
2012/0288742 A1  11/2012  Tanaka et al.
(Continued)

FOREIGN PATENT DOCUMENTS

CN    1513922 A    7/2004
CN  102792493 A   11/2012
(Continued)

*Primary Examiner* — Ula C Ruddock
*Assistant Examiner* — Thomas H. Parsons
(74) *Attorney, Agent, or Firm* — Oblon, McClelland, Maier & Neustadt, L.L.P.

(57) ABSTRACT

An active material for a nonaqueous electrolyte battery according to the embodiment is a composite including at least: a carbonaceous substance; and silicon-containing particles dispersed in the carbonaceous substance, the silicon-containing particles including at least one of silicon, a silicon alloy and a silicon oxide, wherein in an argon ion laser Raman spectrum, the half-width ($\Delta G$) of a peak having a maximum intensity I1 in the range of 1575 $cm^{-1}$ or more and 1625 $cm^{-1}$ or less is 100 $cm^{-1}$ or more and 150 $cm^{-1}$ or less, and the intensity ratio of a peak having a maximum intensity I2 in the range of 500 $cm^{-1}$ or more and 550 $cm^{-1}$ or less to the peak having the maximum intensity I1 in the range of 1575 $cm^{-1}$ or more and 1625 $cm^{-1}$ or less (I2/I1) is 0.25 or more and 0.50 or less.

8 Claims, 6 Drawing Sheets

(51) Int. Cl.
   *H01M 4/587* (2010.01)
   *H01M 4/583* (2010.01)
   *H01M 10/0525* (2010.01)

(52) U.S. Cl.
   CPC ........ *H01M 4/587* (2013.01); *H01M 10/0525* (2013.01); *H01M 2220/30* (2013.01)

(56) References Cited

U.S. PATENT DOCUMENTS

| | | | |
|---|---|---|---|
| 2013/0040199 A1* | 2/2013 | Yamamura | H01M 4/131 |
| | | | 429/218.1 |
| 2013/0130115 A1 | 5/2013 | Park et al. | |
| 2013/0149606 A1 | 6/2013 | Yasuda et al. | |
| 2014/0106230 A1 | 4/2014 | Kim et al. | |
| 2015/0372292 A1 | 12/2015 | Yokoi et al. | |

FOREIGN PATENT DOCUMENTS

| | | |
|---|---|---|
| CN | 103081188 A | 5/2013 |
| CN | 103137953 A | 6/2013 |
| CN | 103840140 A | 6/2014 |
| CN | 104037394 A | 9/2014 |
| JP | 11-54123 A | 2/1999 |
| JP | 11-339796 A | 12/1999 |
| JP | 2004-119176 A | 4/2004 |
| JP | 2005-107476 A | 4/2005 |
| JP | 2008-198610 A | 8/2008 |
| JP | 2012-25997 A | 2/2012 |
| JP | 2012-38561 A | 2/2012 |
| JP | 2012-43457 A | 3/2012 |
| JP | 2012-48865 A | 3/2012 |
| JP | 2012-59509 | 3/2012 |
| JP | 2012-114046 A | 6/2012 |
| JP | 2012-204322 A | 10/2012 |
| JP | 2012-209202 A | 10/2012 |
| JP | 2013-54927 A | 3/2013 |
| JP | 2013-55051 | 3/2013 |
| JP | 2013-110112 A | 6/2013 |
| JP | 2013-528907 A | 7/2013 |
| JP | 2013-206746 A | 10/2013 |
| WO | WO 2010/035919 A1 | 4/2010 |
| WO | WO 2012/026067 A1 | 3/2012 |
| WO | WO 2012/036127 A1 | 3/2012 |
| WO | WO 2014/119238 A1 | 8/2014 |

* cited by examiner

ACTIVE MATERIAL FOR NONAQUEOUS ELECTROLYTE BATTERY, ELECTRODE FOR NONAQUEOUS ELECTROLYTE BATTERY, NONAQUEOUS ELECTROLYTE SECONDARY BATTERY AND BATTERY PACK

CROSS-REFERENCE TO RELATED APPLICATION

This application is based upon and claims the benefit of priority from the Japanese Patent Application No. 2014-247139, filed on Dec. 5, 2014, the entire contents of which are incorporated herein by reference.

FIELD

The embodiment described herein generally relates to an active material for a nonaqueous electrolyte battery, a negative electrode for a nonaqueous electrolyte secondary battery, a nonaqueous electrolyte secondary battery and a battery pack.

BACKGROUND

In recent years, various portable electronic devices have been spreading due to rapid development of techniques for downsizing electronic devices. Batteries as power sources for these portable electronic devices are also required to have a reduced size, and nonaqueous electrolyte secondary batteries having a high energy density receive attention.

Particularly, attempts have been made to use elements that form an alloy with lithium, such as silicon and tin, and substances having a large lithium absorption capacity and a high density, such as amorphous chalcogen compounds. Above all, silicon can absorb lithium up to 4.4 lithium atoms per silicon atom. Accordingly, when silicon is used as a negative electrode material of a nonaqueous electrolyte secondary battery, the negative electrode capacity per mass is about 10 times as large as that when conventional graphitic carbon is used as a negative electrode material. However, silicon significantly changes its volume as lithium is inserted and removed in a charge-discharge cycle, and thus there is a problem in cycle characteristics which is associated with micronization of active material particles, etc.

For solving the above-mentioned problem, attempts have been made to attain a high capacity and improve cycle characteristics by using an active material in which silicon-containing particles are combined with a carbonaceous substance. However, even with such an active material, both a high capacity and cycle characteristics are not sufficiently maintained, and it is required to more satisfactorily maintain both a high capacity and cycle characteristics and improve a capacity and cycle characteristics.

DETAILED DESCRIPTION

The present inventors have arrived at the idea that the nature of a carbonaceous substance in a previously studied active material in which silicon-containing particles are combined with the carbonaceous substance has a significant influence on life characteristics, and examined a relationship between characteristics of a carbonaceous substance and cycle characteristics.

The active material of the embodiment is a composite including at least: a carbonaceous substance; and silicon-containing particles dispersed in the carbonaceous substance, the silicon-containing particles including crystalline silicon and a silicon oxide, wherein in an argon ion laser Raman spectrum, the half-width of a maximum intensity I1 in the range of 1575 $cm^{-1}$ or more or less is 100 $cm^{-1}$ or more and 150 $cm^{-1}$ or less, and the intensity ratio of a maximum intensity I2 in the range of 500 cm-1 or more and 550 $cm^{-1}$ or less to the maximum intensity I1 in the range of 1575 $cm^{-1}$ or more and 1625 $cm^{-1}$ or less (I2/I1) is 0.25 or more and 0.50 or less.

First Embodiment

An active material for a nonaqueous electrolyte battery (hereinafter, sometimes referred to as an "active material") according to the first embodiment is a composite including at least a carbonaceous substance, and silicon-containing particles dispersed in the carbonaceous substance, wherein the silicon-containing particles include at least one of silicon, an alloy containing silicon, and a silicon oxide, and in an argon ion laser Raman spectrum, the half-width (ΔG) of a peak having a maximum intensity I1 in the range of 1575 $cm^{-1}$ or more and 1625 $cm^{-1}$ or less is 100 $cm^{-1}$ or more and 150 $cm^{-1}$ or less, and the intensity ratio of a peak having a maximum intensity I2 in the range of 500 cm-1 or more and 550 $cm^{-1}$ or less to the peak having the maximum intensity I1 in the range of 1575 $cm^{-1}$ or more and 1625 $cm^{-1}$ or less (I2/I1) is 0.25 or more and 0.50 or less.

Hereinafter, for explanation of the embodiment, the active material will be described as an active material that is used in an active material mixture layer of a negative electrode of a nonaqueous electrolyte battery, but the active material of the embodiment may also be used as an active material that is used in an active material mixture layer of a positive electrode. The electrode obtained using the active material will be described as one that is used in a nonaqueous electrolyte secondary battery, but the electrode obtained using the active material of the embodiment may be used in various batteries.

The carbonaceous substance for use in the embodiment includes at least amorphous carbon. Silicon-containing particles as described later are dispersed in the carbonaceous substance. Preferably, the carbonaceous substance exists on the periphery of the silicon-containing particles.

Figure 1:
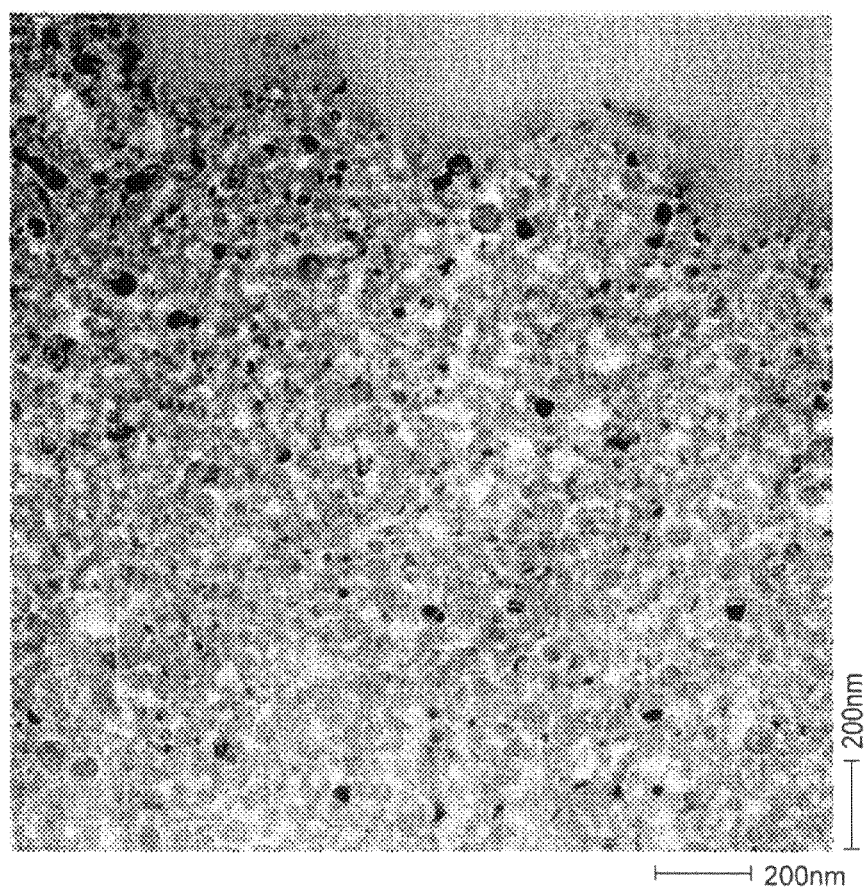
FIG. 1 is a photographed image of a cross section of an active material of the first embodiment with a transmission electron microscope.

The active material of the embodiment is shown in FIG. 1. FIG. 1 is an image of a cross section of the active material of the first embodiment a TEM (transmission electron microscope). As seen in FIG. 1, the silicon-containing particles are shown with a dark color, and portions other than the silicon-containing particles are shown with a light color. The black portions in FIG. 1 are portions in which a part of the silicon-containing particle appears black during observation, and these portions can be considered identical to the above-mentioned dark color portions. The active material in FIG. 1 has a cross section, the longest portion of which has a length of about 3 μm, and it is a part of the cross section that is shown in FIG. 1. The portion on the upper side in FIG. 1, where silicon-containing particles do not exist, corresponds to the outside of the active material.

Measurement of the image in FIG. 1 by TEM-EDX is performed in the following manner. First, a negative electrode including the active material of the embodiment is prepared, and pre-treated by an ion milling method so that the cut section of an active material mixture layer of the prepared negative electrode is smoothed, and the cut section is then observed with a TEM. The reason why a negative electrode is prepared for observing the active material is that since an ion milling method for smoothing the cross section of the active material is applied, it is preferable that the active material is fixed, and thus the form of a negative electrode is suitable. However, a form other than a negative electrode may be employed as long as the active material is in a state that allows an ion milling method to be applied, and further, other method may be used as long as an active material cross section smooth enough to be observed with a TEM can be formed. Existence of amorphous carbon on the periphery of the resulting silicon-containing particles can be determined by using a TEM-EDX method after pre-treating an electrode in the same manner as described above. Specifically, silicon-containing particles and portions other than silicon-containing particles are identified by observation of the inside of the active material with a TEM, and the portions other than silicon-containing particles are subjected to element composition analysis in point analysis by EDX. For TEM-EDX measurement conditions, the accelerating voltage is 200 kV, and the beam diameter is about 1 nm. It can be determined that the carbonaceous substance is amorphous carbon by confirming that a crystal lattice does not appear in the TEM image. When the result of measurement shows that the portions other than silicon-containing particles are amorphous, and include areas containing 90 atom % of carbon, it is determined that the portions are amorphous carbon. The reason why the content of carbon is not necessarily 100 atom % is that in TEM-EDX analysis, very small impurities entering during preparation of the active material are detected, or a substance on the periphery of amorphous carbon is simultaneously detected when the amount of amorphous carbon relative to silicon-containing particles is small.

The carbonaceous substance may include a conductive carbonaceous substance other than amorphous carbon. As the carbonaceous substance, at least one selected from the group consisting of graphite, hard carbon, soft carbon, carbon nano fiber, carbon nanotube and carbon black can be used. These substances are preferable in that the conductivity of the active material is improved, or they serve as an internal backbone of the active material to suppress deformation of active material particles during charge-discharge. The conductive carbonaceous substance is used for imparting conductivity to a negative electrode material. As the above-mentioned conductive carbonaceous substance, these substances may be used alone, or may be used in combination of two or more of the substances. While the conductive carbonaceous substance is not particularly limited, fibrous carbon having an aspect ratio of 10 or more is especially preferable. As fibrous carbon, a fibrous carbon nanotube (CNT)-based carbon material or the like is used. The average diameter of fibrous carbon is preferably 5 nm or more and 1000 nm or less, more preferably 7 nm or more and 100 nm or less. If the content of fibrous carbon is excessively high, the battery capacity is reduced, and therefore it is preferable that fibrous carbon is contained in the negative electrode active material in an amount of 5% by mass or less.

Silicon-containing particles for use in the embodiment include silicon, or an alloy containing silicon. Silicon-containing particles are, for example, in a form in which the surfaces of particles of silicon or an alloy containing silicon are oxidized to form a coating layer of a silicon oxide, or in a form in which silicon particles are dispersed in a silicon oxide. For identification of silicon-containing particles, the above-mentioned measurement by a TEM-EDX method is performed, and when the result shows that there are particles containing silicon, it is determined that the particles are silicon-containing particles. The average particle size of silicon-containing particles is preferably 10 nm or more and 500 nm or less. If the average particle size is excessively small, silicon-containing particles are unevenly dispersed in the carbonaceous substance, and thus when the silicon-containing particles are used in a nonaqueous electrolyte battery, internal stress is locally generated during charge-discharge, so that the active material is easily broken. On the other hand, if the average particle size is excessively large, diffusion of lithium into silicon existing in particles becomes slow, so that charge-discharge is hard to proceed. Therefore, the average particle size of silicon-containing particles is preferably 10 nm or more and 500 nm or less. The average particle size is more preferably 20 nm or more and 400 nm or less, further more preferably 30 nm or more and 300 nm or less. The above-mentioned particle size of silicon-containing particles is determined in the following manner: the active material is observed with a TEM as described above, and an average value of sizes in randomly selected 10 directions is calculated for each of 10 or more silicon-containing particles randomly selected in the obtained image. It should be confirmed that the 10 directions mentioned here do not include mutually similar directions after they are randomly selected.

However, silicon-containing particles having a particle size that falls out of the above-mentioned particle size may exist as long as battery performance is not affected.

Silicon or an alloy containing silicon in silicon-containing particles is preferably crystalline. This is because when silicon or an alloy containing silicon in silicon-containing particles is crystalline, more satisfactory cycle characteristics are exhibited when the battery is subjected to a charge-discharge cycle. The average particle size of particles of silicon or an alloy containing silicon is preferably 1 nm or more and 80 nm or less. If the average particle size is excessively small, each silicon is bonded together to cause grain growth in a charge-discharge cycle when the particles are used in a nonaqueous electrolyte battery, so that cycle characteristics are easily deteriorated. On the other hand, if the average particle size is excessively large, lithium is hard to be inserted and removed in silicon as a whole. Therefore, the average particle size of silicon or an alloy containing silicon is preferably 1 nm or more and 80 nm or less. The average particle size is more preferably 1 nm or more and 60 nm or less, further more preferably 1 nm or more and 40 nm or less. The above-mentioned particle size of silicon-containing particles is determined in the following manner: the active material is observed with a TEM as described above, portions having crystal lattices among silicon in silicon-containing particles are considered as crystalline silicon, and an average value of sizes in randomly selected 10 directions is calculated for each of 10 or more crystalline silicon randomly selected in the obtained image. It should be confirmed that the 10 directions mentioned here do not include mutually similar directions after they are randomly selected. However, crystalline silicon having a particle size that falls out of the above-mentioned particle size may exist as long as battery performance is not affected.

Lithium silicate such as $Li_4SiO_4$ may be dispersed on the surface or at the inside of silicon oxide on the surfaces of particles of silicon or an alloy containing silicon. The lithium silicate can be formed by, for example, mixing the active material of the embodiment and a lithium salt, and heat-treating the mixture to react the silicon oxide with the lithium salt. Examples of the lithium salt include lithium hydroxide, lithium acetate, lithium oxide and lithium carbonate. The silicon oxide on the surface may contain other additives.

The active material is particles which perform insertion and removal of Li and which have an average primary particle size of 0.5 μm or more and 100 μm or less and a specific surface area of 0.5 $m^2$/g or more and 50 $m^2$/g or less. The particle size and specific surface area of the active material have an influence on the speed of the lithium insertion and removal reaction, and a significant influence on negative electrode characteristics. The active material can stably exhibit characteristics as long as its average primary particle size and specific surface area are in the above-mentioned ranges, respectively. Particularly, the average primary particle size is preferably 1 μm or more and 80 μm or less, further preferably 3 μm or more and 30 μm or less. The particle size of the active material has an influence on the speed of the lithium insertion and removal reaction, and a significant influence on negative electrode characteristics, but characteristics can be stably exhibited as long as the average primary particle size is in the above-mentioned range. Also, in application of the active material onto a current collector, problems such as aggregation and deformation of the current collector are hard to occur. The average primary particle size of the active material is determined in the following manner: the active material is observed with a SEM (scanning electron microscope), and an average value of sizes in randomly selected 10 directions is calculated for each of 50 or more active materials randomly selected in the obtained image. It should be confirmed that the 10 directions mentioned here do not include mutually similar directions after they are randomly selected.

Preferably, the active material contains zirconia or stabilized zirconia for retaining the structure of active material particles and preventing aggregation of silicon-containing particles. Prevention of aggregation of silicon-containing particles has the advantage of improving cycle characteristics.

The active material in the embodiment is one in which in an argon ion laser Raman spectrum, the half-width of a peak having a maximum intensity I1 in the range of 1575 $cm^{-1}$ or more and 1625 $cm^{-1}$ or less is 100 $cm^{-1}$ or more and 150 $cm^{-1}$ or less, and the intensity ratio of a peak having a maximum intensity I2 in the range of 500 cm-1 or more and 550 $cm^{-1}$ or less to the peak having the maximum intensity I1 in the range of 1575 $cm^{-1}$ or more and 1625 $cm^{-1}$ or less (I2/I1) is 0.25 or more and 0.50 or less.

Figure 2:
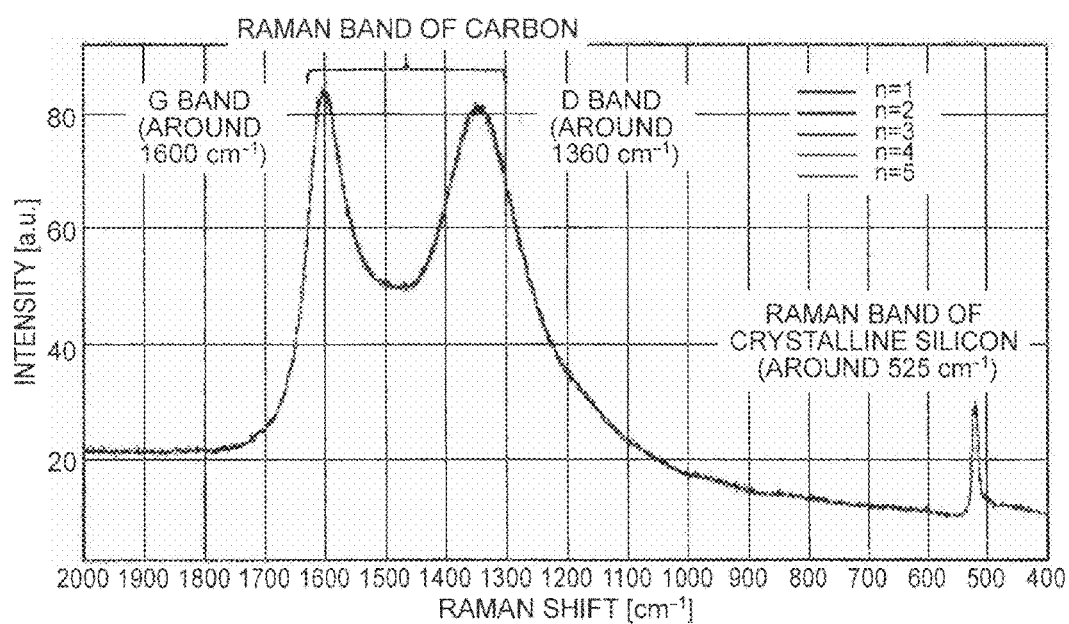
FIG. 2 is an argon ion laser Raman spectrum of an active material of the first embodiment.

FIG. 2 shows one example of an argon ion laser Raman spectrum of an active material of the embodiment. In the embodiment, results of continuously measuring the same sample five times are overlaid one on another to confirm that the measurement has reproducibility. In the embodiment, a difference between the base value and the peak value in the obtained Raman spectrum is defined as an intensity of the peak. The base value refers to an intensity at a point on the side of having a Raman shift [$cm^{-1}$] larger than that of the peak and immediately before the intensity increases toward the peak. Specifically, it is preferable to use an intensity at a point on the side of having a larger Raman shift [$cm^{-1}$] over a range in which the intensity increases by 5% within 50 $cm^{-1}$. In FIG. 2, the intensity at 1800 $cm^{-1}$ is used for the base value of the peak around 1600 $cm^{-1}$ (correctly 1600 to 1605 $cm^{-1}$), and the intensity at 550 $cm^{-1}$ is used for the base value of the peak around 520 $cm^{-1}$ (correctly 518 to 522 $cm^{-1}$). For the base value of the peak around 1360 $cm^{-1}$, the intensity at 1800 $cm^{-1}$ is used rather than the intensity at 1480 $cm^{-1}$. The reason for this is that around 1480 $cm^{-1}$, the skirt of the peak around 1360 $cm^{-1}$ and the skirt of the peak around 1600 $cm^{-1}$ overlap each other, and thus the state of the base is different from that in measurement as seen in FIG. 2.

The active material of the embodiment is one in which in an argon ion laser Raman spectrum, the half-width (ΔG) of a peak having a maximum intensity I1 in the range of 1575 $cm^{-1}$ or more and 1625 $cm^{-1}$ or less is 100 $cm^{-1}$ or more and 150 $cm^{-1}$ or less. When the active material has a half-width in the above-mentioned range, the conductivity of the inside of the active material can be kept at a level that is acceptable in practical use while high cycle characteristics are achieved.

For conditions for measurement of an argon ion laser Raman spectrum, a powder of the active material is placed in a sample chamber, and then measured in a macro-mode with an excitation wavelength of 514.5 nm and a laser power of 10 mW. The spot diameter of the laser is about 100 μm.

FIG. 2 shows a Raman spectrum measured using the above-mentioned conditions for one example of the active material of the embodiment. The peak existing around 1600 $cm^{-1}$, i.e. the peak having the maximum intensity I1 in the range of 1575 $cm^{-1}$ or more and 1625 $cm^{-1}$ or less is generally called a G band, and as its half-width ΔG increases, the graphitization degree generally decreases. In this embodiment, it has been found that cycle characteristics are improved when ΔG is in the range of 100 $cm^{-1}$ or more. This is because the lower the graphitization degree, the more hardly the active material is deformed by stress resulting from expansion and contraction of silicon due to charge-discharge. On the other hand, if ΔG is excessively large, cycle characteristics are high, but there may be the problem that the conductivity of amorphous carbon is reduced, so that a high charge-discharge rate is hard to be applied. Therefore, the half-width is 100 $cm^{-1}$ or more and 150 $cm^{-1}$ or less. The half-width is more preferably 100 $cm^{-1}$ or more and 120 $cm^{-1}$ or less, further preferably 105 $nm^{-1}$ or more and 115 $nm^{-1}$ or less.

The active material of the embodiment is one in which ΔG satisfies the above-mentioned requirement, and the intensity ratio of the peak having the maximum intensity I2 in the range of 500 $cm^{-1}$ or more and 550 $cm^{-1}$ or less to the peak having the maximum intensity I1 in the range of 1575 $cm^{-1}$ or more and 1625 $cm^{-1}$ or less (I2/I1) is 0.25 or more and 0.50 or less. When the intensity ratio (I2/I1) is in the above-mentioned range, high cycle characteristics can be achieved. The peak around 525 $cm^{-1}$, i.e. the peak having the maximum intensity I2 in the range of 500 $cm^{-1}$ or more and 550 $cm^{-1}$ or less is a Raman band of crystalline silicon, and a higher intensity ratio of the peak around 525 $cm^{-1}$ to the peak around 1600 $cm^{-1}$ (I2/I1) indicates a smaller thickness of amorphous carbon existing on the periphery of crystalline silicon. If the intensity ratio is excessively low, the effect of generating a thermal decomposition gas from amorphous carbon in an active material preparing step increases, a large number of pores are thus easily formed in the vicinity of crystalline silicon in the active material, and therefore when the active material is used in a nonaqueous electrolyte battery, amorphous carbon is easily broken during charge-discharge, so that cycle characteristics are easily deteriorated. On the other hand, if the intensity ratio is excessively high, there is the problem that amorphous carbon is easily detached from the periphery of crystalline silicon due to a charge-discharge cycle, leading to deterioration of cycle characteristics. Therefore, in this embodiment, the intensity ratio of the peak having the maximum intensity I2 in the range of 500 $cm^{-1}$ or more and 550 $cm^{-1}$ or less to the peak having the maximum intensity I1 in the range of 1575 $cm^{-1}$ or more and 1625 $cm^{-1}$ or less (I2/I1) is 0.25 or more and 0.50 or less. The intensity ratio is preferably 0.25 or more and 0.40 or less.

In the argon ion laser Raman spectrum, the peak around 1360 $cm^{-1}$, i.e. the peak having the maximum intensity (ID) in the range of 1320 $cm^{-1}$ or more and 1380 $cm^{-1}$ or less is generally called a D band for showing a crystallinity state of a carbonaceous substance. Generally, the peak having the maximum intensity (ID) around 1360 $cm^{-1}$ to the intensity ratio of the peak having the maximum intensity I1 in the range of 1575 $cm^{-1}$ or more and 1625 $cm^{-1}$ or less (ID/I1) is often evaluated. In the active material of the embodiment, the intensity ratio ID/I1 is often in the range of 0.9 or more and 1.1 or less. This is not a necessary condition for improving cycle characteristics, but is obtained as a result of producing the active material of the embodiment.

(Production Method) A method for producing an active material for a nonaqueous electrolyte secondary battery will now be described.

The active material is prepared in the following manner: particles containing silicon atoms, such as those of silicon or a silicon-silicon oxide raw material, are mixed with a carbon precursor of at least a carbonaceous substance using a dispersion medium, and the mixture thus obtained is then dried and solidified, and then fired.

The particles containing silicon atoms may be, for example, $SiO_x$ ($0<x\leq1.5$) particles. Examples of such particles include particles in which the surfaces of fine particles of crystalline silicon are coated with an oxide film, and particles obtained by heating silicon monoxide to about 1100° C. in an inert gas to precipitate crystalline silicon therein. The average primary particle size of the particles containing silicon atoms is preferably 10 nm or more and 500 nm or less, further preferably 30 nm or more and 300 nm or less. The particles containing silicon atoms may also be particles of an alloy containing silicon. As the alloy mentioned here, for example, a silicon-titanium alloy can be used.

As the carbonaceous precursor, a substance that forms amorphous carbon when thermally decomposed by heating is used, and sugars and sugar acids are particularly suitable. Among them, sucrose, lactose, maltose, trehalose, cellobiose, glucose, fructose, galactose, ascorbic acid and glucuronic acid are preferable. Preferably, these carbon precursors are crushed so as to have an average particle size of 10 μm or less before a mixing process.

Examples of the dispersion medium may include water, ethanol, isopropyl alcohol, ketones such as acetone, N-methylpyrrolidone, fatty acids such as oleic acid and linoleic acid, and glycols such as ethylene glycol and propylene glycol. Alternatively, the dispersion medium may be a liquid obtained by mixing a binder agent or a surfactant with the above-mentioned compound. The mixing method using a dispersion medium may be a kneading method in which the amount of a liquid phase relative to a solid phase is small, or may be a mixing-stirring method in which the amount of a liquid phase relative to a solid phase is large. The mixing-stirring method can be carried out using, for example, any of various kinds of stirring apparatuses, ball mills, bead mill apparatuses and combinations thereof. Alternatively, mixing may be performed while performing heating in a part of a mixing process. What kind of mixing method is appropriate depends on the types of particles containing silicon atoms, the carbonaceous precursor and the dispersion medium, or the blending ratio thereof, and a combination thereof is selected so that the argon ion laser Raman spectrum of an active material produced is consistent with that of the active material of the embodiment. The characteristics of the active material are influenced not only by a combination of the types and amounts of the raw materials, and the mixing method, but also by conditions for preparation of an active material as described below. Therefore, finally an active material obtained through the combination of all thereof is required to satisfy the scope of the present invention.

The mixture obtained by mixing is dried and solidified to obtain a solid. Drying can be performed by leaving the mixture in the air or heating the mixture. Drying may be performed under reduced pressure, or may be performed by circulating a gas such as air. Drying is intended for vaporizing the dispersion medium to reduce the amount thereof in the mixture, and an appropriate method is selected according to the boiling point and vapor pressure of the dispersion medium.

The solid obtained by drying and solidification is heated. For heating, the solid is heated under an inert atmosphere of argon (Ar) or the like, so that the carbon precursor is changed into amorphous carbon, thereby obtaining a composite including at least a carbonaceous substance and silicon-containing particles dispersed in the carbonaceous substance. The preferable temperature in heating is in the range of 600° C. or higher and 1500° C. or lower, preferably 800° C. or higher and 1300° C. or lower. The crystallinity of amorphous carbon is apt to decrease as the temperature decreases, and the crystallinity of amorphous carbon is apt to increase as the temperature increases. The heating time is 1 hour or more and 12 hours or less.

Second Embodiment

An active material for a nonaqueous electrolyte battery according to the second embodiment includes an active material mixture layer containing the active material for a nonaqueous electrolyte battery according to the first embodiment. Specifically, the active material of the second embodiment includes a current collector, and an active material mixture layer, which contains a composite including at least a carbonaceous substance and silicon-containing particles dispersed in the carbonaceous substance, and a binder, on one surface or each of both surfaces of the current collector. Hereinafter, an electrode of the embodiment will be described with a negative electrode as an example, but the electrode of the embodiment may be used as a positive electrode. Hereinafter, the embodiment will be described with a nonaqueous electrolyte secondary battery as an example, but the electrode of the embodiment may be used in various batteries.

Figure 3:
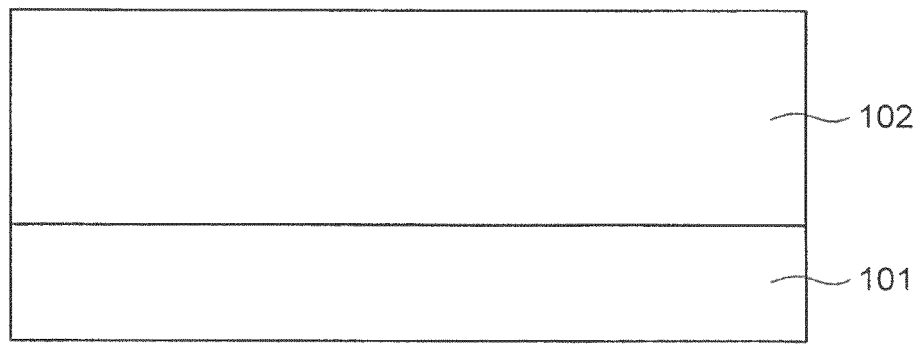
FIG. 3 is a conceptual view of an electrode of the second embodiment.

FIG. 3 is a conceptual view of an electrode of the second embodiment. A negative electrode 100 of the second embodiment contains a negative electrode mixture layer 102 and a negative electrode current collector 101. The negative electrode mixture layer 102 is a layer disposed on the negative electrode current collector 101 and containing an active material. The negative electrode mixture layer 102 contains a negative electrode active material, and a conducting material and a binder. The binder joins the negative electrode mixture layer and the negative electrode current collector 101 to each other.

The thickness of the negative electrode mixture layer 102 is preferably in the range of 1 μm or more and 150 μm or less. Therefore, in the case where the negative electrode mixture layer 102 is carried on each of both surfaces of the negative electrode current collector 101, the total thickness of the layers is in the range of 2 μm or more and 300 μm or less. The thickness of the layer on one surface is more preferably in the range of 10 μm or more and 100 μm or less, further preferably in the range of 30 μm or more and 100 μm or less. When the thickness is in the above-mentioned range, the large current discharge characteristics and cycle characteristics of a nonaqueous electrolyte battery including the negative electrode 100 are considerably improved.

Preferably, the blending ratio of the negative electrode active material, the conducting agent and the binder in the negative electrode mixture layer 102 is 57% by mass or more and 95% by mass or less for the negative electrode active material, 3% by mass or more and 20% by mass or less for the conducting agent, and 2% by mass or more and 40% by mass or less for the binder. When the blending ratio of the negative electrode active material, the conducting agent and the binder is in the above-mentioned range, a nonaqueous electrolyte battery including the negative electrode 100 has satisfactory large current discharge characteristics and cycle characteristics.

The negative electrode current collector 101 of the embodiment is a conductive member that is bound with the negative electrode mixture layer 102. For the negative electrode current collector 101, a conductive substrate having a porous structure, or a nonporous conductive substrate is used. Such a conductive substrate can be formed from, for example, copper, stainless steel or nickel. The thickness of the negative electrode current collector 101 is preferably in 5 μm or more and 20 μm or less. When the thickness of the negative electrode current collector 101 is in this range, the electrode strength can be well balanced with weight reduction.

The conducting agent has an effect of improving the conductivity of the negative electrode 100, and is preferably dispersed in the negative electrode mixture layer 102. Examples of the conducting agent include acetylene black, carbon black and graphite. As the conducting agent, one having a shape such as a scalelike shape, a granular shape or a fibrous shape is used. These conducting agents are used alone, or used in combination of two or more thereof. The conducting agent can often perform insertion and removal of Li, but its charge-discharge capacity is smaller than that of the active material of the present invention. In the present invention, a composite that is mainly involved in insertion and removal of Li, and includes at least a carbonaceous substance and silicon-containing particles dispersed in the carbonaceous substance is defined as an active material, and the above-mentioned substance is defined as a conducting agent.

The binder fills gaps in the dispersed negative electrode active material to bind the negative electrode active material with the conducting agent, and bind the negative electrode active material with the negative electrode current collector 101. Examples of the binder include polytetrafluoroethylene (PTFE), polyvinylidene fluoride (PVdF), polyacrylic acid, polysaccharides such as alginic acid and cellulose, and derivatives thereof, ethylene-propylene-diene copolymers (EPDM), styrene-butadiene rubber (SBR), polyimide, polyamide and polyamide imide. Among them, polymers having an imide backbone, such as polyimide, are more preferable because the binding force with the negative electrode current collector 101 is high, and the binding force between negative electrode active materials can be improved. The binders are used alone, or used in combination of two or more thereof. In the case where two or more binders are used in combination, the life characteristics of the negative electrode 100 can be improved by employing a combination of a binder excellent in binding between negative electrode active materials and a binder excellent in binding between the negative electrode active material and the negative electrode current collector 101, or a combination of a binder having a high hardness and a binder excellent in flexibility.

A method for producing a negative electrode will now be described.

First, a negative electrode active material, a conducting agent and a binder are suspended in a generic solvent to prepare a slurry.

The slurry is then applied to the current collector 101, and dried to form the negative electrode mixture layer 102, and pressing is then performed to prepare the negative electrode 100. The degree at which the negative electrode active material is embedded in the current collector 101 can be adjusted by the pressure of pressing. A pressing pressure of less than 0.2 kN/cm is not preferable because the negative electrode active material is not sufficiently embedded in the negative electrode current collector 101. A pressing pressure of more than 10 kN/cm is not preferable because damage occurs such as breakage of the negative electrode active material and the current collector 101. Therefore, the pressing pressure on the negative electrode active material layer 102 formed by drying the slurry is preferably 0.5 kN/cm or more and 5 kN/cm or less. The pressing pressure mentioned here is a value when a roller pressing machine is used, and the value is determined by dividing a pressure [kN] by the width [cm] of the negative electrode mixture layer where the pressure [kN] is measured during pressing. The width of the negative electrode mixture layer is a length in a direction parallel to the roll shaft of the roller pressing machine, and for example, when the negative electrode mixture layer that looks rectangular when seen from above is made to obliquely pass through the roller pressing machine, a representative length is employed.

The negative electrode for a nonaqueous electrolyte battery according to this embodiment is formed using the active material for a nonaqueous electrolyte battery according to the first embodiment, a nonaqueous electrolyte battery obtained using the negative electrode has a high capacity and improved cycle characteristics.

Third Embodiment

A nonaqueous electrolyte battery according to the third embodiment will now be described.

The nonaqueous electrolyte battery according to the third embodiment includes the electrode for a nonaqueous electrolyte battery according to the second embodiment. Specifically, the nonaqueous electrolyte battery includes an container, a positive electrode stored in the container, a negative electrode stored in the container so as to be spatially separated from the positive electrode, for example a separator interposed between the negative electrode and the positive electrode, and a nonaqueous electrolyte filling the inside of the container.

Hereinafter, the constituent members of the nonaqueous electrolyte secondary battery according to this embodiment, i.e. the negative electrode, the positive electrode, the nonaqueous electrolyte, the separator and the container will be described in detail. (1) The negative electrode according to the second embodiment is used as the negative electrode. (2) The positive electrode includes a positive electrode current collector, and a positive electrode mixture layer which is formed on one surface or each of both surfaces of the positive electrode current collector, and contains a positive electrode active material, a conducting agent and a binder. The conducting agent and the binder are optional components.

The thickness of the positive mixture layer on one surface is preferably in the range of 1 μm or more and 150 μm or less, more preferably 30 μm or more and 120 μm or less. Therefore, in the case where the positive electrode mixture layer is provided on each of both surfaces of the positive electrode current collector, the total thickness of the positive electrode mixture layers is in the range of 2 μm or more and 300 μm or less.

When the thickness of the positive electrode mixture layer is in the above-mentioned range, the large current discharge characteristics and cycle characteristics of a nonaqueous electrolyte secondary battery including the positive electrode are considerably improved.

As the positive electrode active material, various oxides, for example manganese dioxide, lithium manganese composite oxides, lithium-containing nickel cobalt oxides (e.g. $LiCoO_2$), lithium-containing nickel cobalt oxides (e.g. $LiNi_{0.8}Co_{0.2}O_2$) and lithium manganese composite oxides (e.g. $LiMn2O_4$ and $LiMnO_2$) are used. The use of these positive electrode active material is preferable because the nonaqueous electrolyte secondary battery has a high voltage.

The average primary particle size of the positive electrode active material is preferably 100 nm to 1 μm. A positive electrode active material having an average primary particle size of 100 nm or more is easily handled in industrial production. A positive electrode active material having an average primary particle size of 1 μm or less can ensure that diffusion of lithium ions in a solid smoothly proceeds.

The conducting agent improves the current collection performance of the positive electrode active material to reduce the contact resistance between the positive electrode active material and the positive electrode current collector. Examples of the conducting agent include those including acetylene black, carbon black, artificial graphite, natural graphite, carbon fibers and conductive polymers.

One or two or more of the conducting agents can be used.

The binder fills gaps in the dispersed positive electrode active material to bind the positive electrode active material with the conducting agent, and bind the positive electrode active material with the positive electrode current collector. Examples of the binder include organic substances including polytetrafluoroethylene (PTFE), polyvinylidene fluoride (PVdF), fluorine-based rubber and polyacrylic acid.

One or two or more of the binders can be used.

As an organic solvent for dispersing the binder, for example, N-methyl-2-pyrrolidone (NMP), dimethyl formamide (DMF) or the like is used.

Preferably, the blending ratio of the positive electrode active material, the conducting agent and the binder in the positive electrode mixture layer is 80% by mass or more and 95% by mass or less for the positive electrode active material, 3% by mass or more and 20% by mass or less for the conducting agent, and 2% by mass or more and 7% by mass or less for the binder because satisfactory large current discharge characteristics and cycle characteristics are achieved in a nonaqueous electrolyte battery including the positive electrode.

The positive electrode current collector is a conductive member that is bound with the positive electrode mixture layer. For the positive electrode current collector, a conductive substrate having a porous structure, or a nonporous conductive substrate is used.

The thickness of the positive electrode current collector is preferably in 8 μm or more and 15 μm or less. The reason why the thickness of the positive electrode current collector is in this range is that the electrode strength can be well balanced with weight reduction.

A method for producing a positive electrode will now be described.

First, a positive electrode active material, a conducting agent and a binder are suspended in a generic solvent to prepare a slurry.

The slurry is then applied to the positive electrode current collector, and dried to form the positive electrode mixture layer, and pressing is then performed to obtain a positive electrode.

Alternatively, the positive electrode may be prepared in the following manner: a positive electrode active material, a binder, and a conducting agent to be blended as necessary are formed into a pellet shape to provide a positive electrode mixture layer, and the positive electrode mixture layer is disposed on a positive electrode current collector.

(3) an electrolyte impregnation type polymer electrolyte, a macromolecular electrolyte or an inorganic solid electrolyte is used as the nonaqueous electrolyte nonaqueous electrolyte.

The nonaqueous electrolyte solution is a liquid electrolyte solution which is prepared by dissolving an electrolyte in a nonaqueous solvent (organic solvent). The nonaqueous electrolyte solution is held in gaps in an electrode group.

As the nonaqueous solvent, it is preferable to use a nonaqueous solvent mainly composed of a mixed solvent of cyclic carbonate such as ethylene carbonate (EC), propylene carbonate (PC) or vinylene carbonate (hereinafter, referred to as a "first solvent") and a nonaqueous solvent having a viscosity lower than that of the cyclic carbonate (hereinafter, referred to as a "second solvent").

Examples of the second solvent include chain carbonates such as dimethyl carbonate (DMC), diethyl carbonate (DEC) and methylethyl carbonate (MEC), ethyl propionate, methyl propionate, γ-butyrolactone (GBL), acetonitrile (AN), ethyl acetate (EA), toluene, xylene and methyl acetate (MA). These second solvents can be used alone, or in the form of a mixture of two or more thereof. Particularly, if the second solvent has an excessively large donor number, it is excessively strongly bonded to Li ions, so that the Li ion conductivity is reduced, and therefore the donor number is preferably 16.5 or less.

The viscosity of the second solvent is preferably 2.8 cP or less at 25° C. The blending amount of ethylene carbonate or propylene carbonate in the mixed solvent of the first solvent and the second solvent is preferably 1.0% or more and 80% or less, more preferably 20% or more and 75% or less in terms of a volume ratio. If the volume ratio of the second solvent is excessively small, the viscosity of the nonaqueous electrolyte solution increases, so that the Li ion conductivity is reduced. On the other hand, if the volume ratio of the second solvent is excessively large, the function of PC or EC is hindered, so that the Li ion conductivity is reduced. Therefore, the volume ratio is preferably in the above-mentioned range.

Examples of the electrolyte contained in the nonaqueous electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluorometasulfonate ($LiCF_3SO_3$) and bistrifluoromethylsulfonylimide lithium [$LiN(CF_3SO_2)_2$]. Among them, lithium hexafluorophosphate or lithium tetrafluoroborate is preferably used. The amount of the electrolyte dissolved in the nonaqueous solvent contained in the nonaqueous electrolyte is preferably 0.5 mol/L or more and 2.0 mol/L or less. If the amount of electrolyte dissolved is excessively small, movement of ions is hard to occur, so that the Li ion conductivity is reduced. On the other hand, if the amount of the electrolyte dissolved is more than 2.0 mol/L, the Li ion conductivity is reduced because the viscosity of the nonaqueous electrolyte solution increases.

(4) The separator is disposed between the positive electrode and the negative electrode.

The separator is formed from, for example, a porous film including polyethylene (PE), polypropylene (PP), cellulose or polyvinylidene fluoride (PVdF), or a synthetic resin nonwoven fabric. Among them, the porous film formed from polyethylene or polypropylene is preferable because it can be melted at a constant temperature to cut off the current, so that stability can be improved.

The thickness of the separator is preferably 5 μm or more and 30 μm or less, more preferably 10 μm or more and 25 μm or less. If the thickness of the separator is less than 5 μm, the strength of the separator may be remarkably reduced to easily cause an internal short-circuit. On the other hand, if the thickness of the separator is more than 30 μm, the distance between the positive electrode and the negative electrode may increase the internal resistance.

The separator has a heat shrinkage percentage of preferably 20% or less, more preferably 15% or less when left standing at 120° C. for 1 hour. If the heat shrinkage percentage of the separator is more than 20%, the possibility is increased that heating causes a short-circuit between the positive electrode and the negative electrode.

The separator has a porosity of preferably 30% or more and 70% or less, more preferably 35% or more and 70% or less.

The reason why the porosity of the separator is preferably in the above-mentioned range is as follows. If the porosity is less than 30%, it may be difficult to achieve high electrolyte retainability in the separator. On the other hand, if the porosity is more than 70%, the separator may not have a sufficient strength.

The separator has an air permeability of preferably 30 seconds/100 $cm^3$ or more and 500 seconds/100 $cm^3$ or less, more preferably 50 seconds/100 $cm^3$ or more and 300 seconds/100 $cm^3$ or less.

If the air permeability is less than 30 seconds/100 $cm^3$, the separator may not have a sufficient strength. If the air permeability is more than 500 seconds/100 $cm^3$, a high lithium ion mobility may not be achieved in the separator.

(5) A metallic container or a laminate film exterior container is used as the container in which the positive electrode, the negative electrode and the nonaqueous electrolyte are stored.

As the metallic container, a metallic can composed of aluminum, an aluminum alloy, iron, stainless steel or the like and having a shape such as a rectangular shape or a cylindrical shape. The thickness of the metallic container is preferably 1 mm or less, more preferably 0.5 mm or less, further preferably 0.2 mm or less.

The aluminum alloy is preferably an alloy containing an element such as magnesium, zinc or silicon. When the aluminum alloy contains a transition metal such as iron, copper, nickel or chromium, the content of the transition metal is preferably 100 ppm or less. A metallic container composed of an aluminum alloy has an extremely increased strength as compared to a metallic container composed of aluminum, so that the thickness of the metallic container can be reduced. As a result, a nonaqueous electrolyte secondary battery which is thin and light, has a high power and is excellent in heat dissipation can be obtained.

Examples of the laminate film include multilayer films in which an aluminum foil is covered with a resin film. As a resin that forms the resin film, a macromolecular compound such as polypropylene (PP), polyethylene (PE), nylon or polyethylene terephthalate (PET) is used. The thickness of the laminate film is preferably 0.5 mm or less, more preferably 0.2 mm or less. The purity of the aluminum foil is preferably 99.5% or more.

This embodiment can be applied nonaqueous electrolyte secondary batteries of various types such as a flat type (thin type), a rectangular type, a cylindrical type, a coin type and a button type.

The nonaqueous electrolyte secondary battery according to this embodiment may further include a lead that is electrically connected to an electrode group including the above-mentioned positive electrode and negative electrode. The nonaqueous electrolyte secondary battery according to this embodiment may also include, for example, two leads. In this case, one lead is electrically connected to a positive electrode current collection tab, and the other lead is electrically connected to a negative electrode current collection tab.

The material of the lead is not particularly limited, and for example, the same material as that of the positive electrode current collector and the negative electrode current collector is used.

The nonaqueous electrolyte secondary battery according to this embodiment may further include a terminal that is electrically connected to the lead and drawn from the container. The nonaqueous electrolyte secondary battery according to this embodiment may also include, for example, two terminals. In this case, one terminal is connected to the lead electrically connected to the positive electrode current collection tab, and the other terminal is connected to the lead electrically connected to the negative electrode current collection tab.

The material of the terminal is not particularly limited, and for example, the same material as that of the positive electrode current collector and the negative electrode current collector is used.

Figure 4:
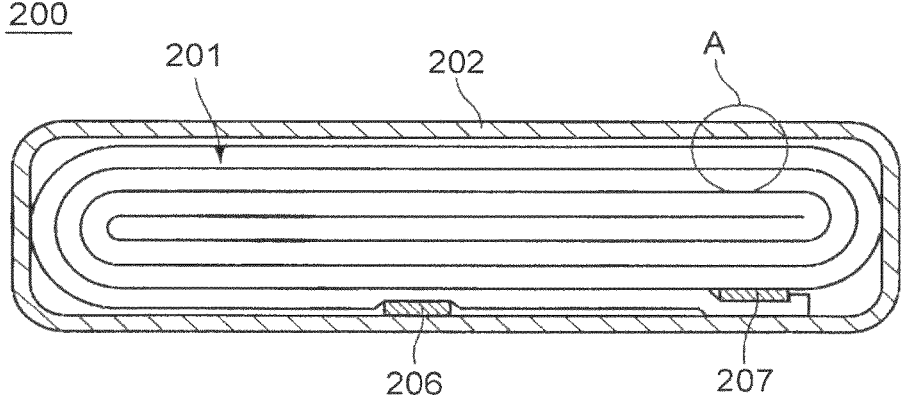
FIG. 4 is a conceptual sectional view of a nonaqueous electrolyte battery of the third embodiment.
Figure 5:
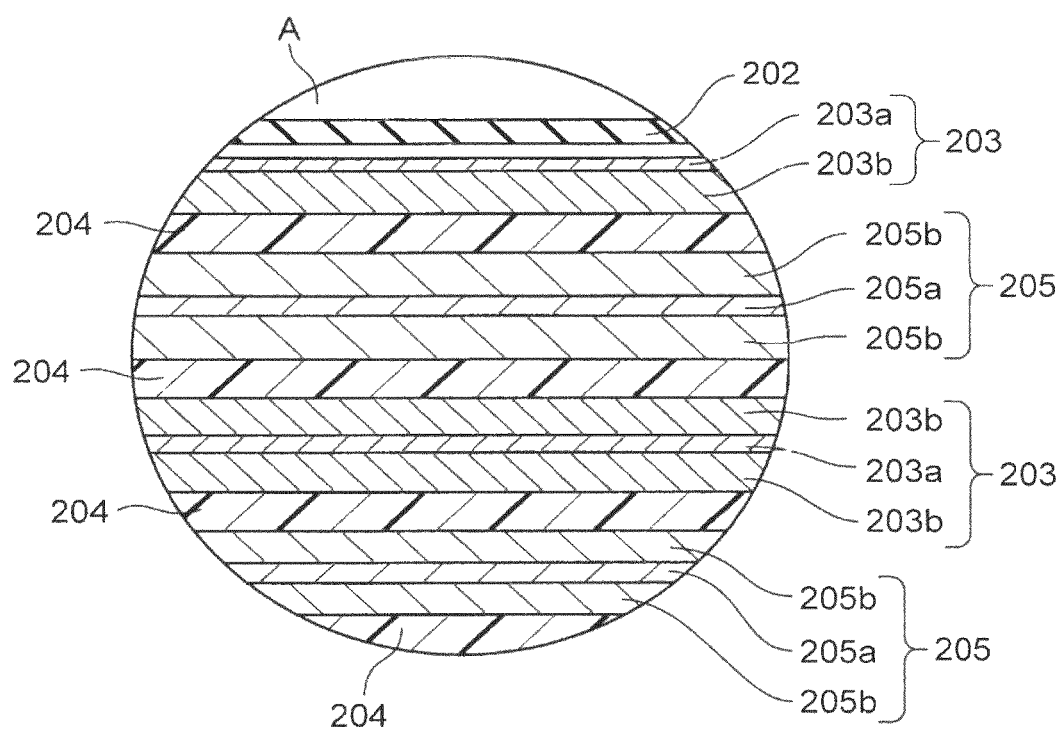
FIG. 5 is a conceptual enlarged sectional view of a nonaqueous electrolyte battery of the third embodiment.

(6) Nonaqueous electrolyte secondary battery: A flat type nonaqueous electrolyte secondary battery (nonaqueous electrolyte secondary battery) 200 as shown in FIGS. 4 and 5 will now be described as one example of the nonaqueous electrolyte battery according to this embodiment. FIG. 4 is a conceptual sectional view of a nonaqueous electrolyte battery of the third embodiment, and FIG. 5 is a conceptual enlarged sectional view of the part A shown in FIG. 4.

The nonaqueous electrolyte secondary battery 200 shown in FIG. 4 is formed by storing a flat wound electrode group 201 in an container 202. The container 202 may be a laminate film formed in the shape of a bag, or may be a metallic container. The flat wound electrode group 201 is formed by spirally winding a laminate with a negative electrode 203, a separator 204, a positive electrode 205 and a separator 204 laminated in this order from the outside, i.e. the container 202 side, and performing press molding. The electrode situated at the outermost layer is the negative electrode 203, and the negative electrode 203 has a configuration in which a negative electrode mixture layer 203b is formed on only one surface of a negative electrode current collector 203a on the battery inner surface side. The negative electrode 203 other than that at the outermost layer has a configuration in which the negative electrode mixture layer 203b is formed on each of both surfaces of the negative electrode current collector 203a. The positive electrode 205 has a configuration in which a negative electrode mixture layer 205b is formed on each of both surfaces of a positive electrode current collector 205a. The above-mentioned gel-like nonaqueous electrolyte may be used in place of the separator 204.

In the wound electrode group 201 shown in FIG. 4, a negative electrode terminal 206 is electrically connected to the negative electrode current collector 203a of the negative electrode 203 on the outermost periphery in the vicinity of the outer peripheral edge of the wound electrode group 201. A positive electrode terminal 207 is electrically connected to the positive electrode current collector 205a of the positive electrode 205 on the inside. The negative electrode terminal 206 and positive electrode terminal 207 are extended to the outside of the container 202, or connected to a lead electrode provided in the container 202.

In production of the nonaqueous electrolyte secondary battery 200 including an container composed of a laminate film, the wound electrode group 201, to which the negative electrode terminal 206 and the positive electrode terminal 207 are connected, is inserted into the bag-shaped container having an opening, a liquid nonaqueous electrolyte is injected from the opening of the container 202, and the opening of the container 202 is heat-sealed with the negative electrode terminal 206 and the positive electrode terminal 207 sandwiched by the container 202, thereby completely sealing the wound electrode group 201 and the liquid nonaqueous electrolyte.

In production of the nonaqueous electrolyte secondary battery 200 including an container composed of a metallic container, the wound electrode group 201, to which the negative electrode terminal 206 and the positive electrode terminal 207 are connected, is inserted into metallic container, a liquid nonaqueous electrolyte is injected from the opening of the container 202, and further, a lid body is attached to the metallic container to seal the opening.

For the negative electrode terminal 206, for example, a material having electric stability and conductivity where the potential to lithium is in the range of 1 V or more and 3 V or less may be used. Specifically, aluminum, or an aluminum alloy containing an element such as Mg, Ti, Zn, Mn, Fe, Cu or Si may be used. The material of the negative electrode terminal 206 is preferably the same as that of the negative electrode current collector 203a for reducing the contact resistance with the negative electrode current collector 203a.

For the positive electrode terminal 207, a material having electric stability and conductivity where the potential to lithium is in the range of 3 V or more and 4.25 V or less may be used. Specifically, aluminum, or an aluminum alloy containing an element such as Mg, Ti, Zn, Mn, Fe, Cu or Si may be used. The material of the positive electrode terminal 207 is preferably the same as that of the positive electrode current collector for reducing the contact resistance with the positive electrode current collector.

Hereinafter, the constituent members of the nonaqueous electrolyte secondary battery 200, i.e. the container 202, the negative electrode 203, the positive electrode 205, the separator 204 and the nonaqueous electrolyte will be described in detail.

(1) The above-mentioned container is used as the container 202. (2) The above-mentioned negative electrode is used as the negative electrode 203. (3) The above-mentioned positive electrode is used as the positive electrode 205. (4) The above-mentioned separator is used as the separator 204. (5) The above-mentioned nonaqueous electrolyte is used as the nonaqueous electrolyte.

The nonaqueous electrolyte battery according to the third embodiment is not limited to one having the configuration shown in FIGS. 4 and 5, and may have, for example, a configuration in which a laminated electrode group is stored in an container. The laminated electrode group has a structure in which positive electrodes and negative electrodes are alternately laminated with a separator interposed between each positive electrode and each negative electrode.

A plurality of positive electrodes exists, and each includes a positive electrode current collector, and a positive electrode active material-containing layer carried on each of both surfaces of the positive electrode current collector.

A plurality of negative electrodes exists, and each includes a negative electrode current collector, and a negative electrode active material-containing layer carried on each of both surfaces of the negative electrode current collector.

One side of the negative electrode current collector of each negative electrode protrudes from the negative electrode. The protruding negative electrode current collector is electrically connected to a belt-shaped negative electrode terminal. The tip of the belt-shaped negative electrode terminal is drawn to the outside from the container. A side of the positive electrode current collector of the positive electrode, which is situated opposite to the protruding side of the negative electrode current collector, protrudes from the positive electrode. The positive electrode current collector protruding from the positive electrode is electrically connected to a belt-shaped positive electrode terminal. The tip of the belt-shaped positive electrode terminal is situated opposite to the negative electrode terminal, and drawn to the outside from the side of the container.

The materials, blending ratios, dimensions and so on of the members that form the nonaqueous electrolyte secondary battery obtained using the laminated electrode group are the same as those of the constituent members of the nonaqueous electrolyte secondary battery 200 described in FIGS. 4 and 5.

According to this embodiment described above, a nonaqueous electrolyte secondary battery can be provided.

The nonaqueous electrolyte secondary battery according to this embodiment includes a negative electrode, a positive electrode, a nonaqueous electrolyte, a separator and an exterior. The negative electrode is formed using the negative electrode material for a nonaqueous electrolyte battery according to the first embodiment.

Fourth Embodiment

A battery pack according to the fourth embodiment will now be described.

The battery pack according to the fourth embodiment has one or more nonaqueous electrolyte secondary battery (i.e. single battery) according to the third embodiment. In the case where the battery pack includes a plurality of single batteries, the single batteries are disposed so as to be electrically connected in series, in parallel, or in series and in parallel.

Figure 6:
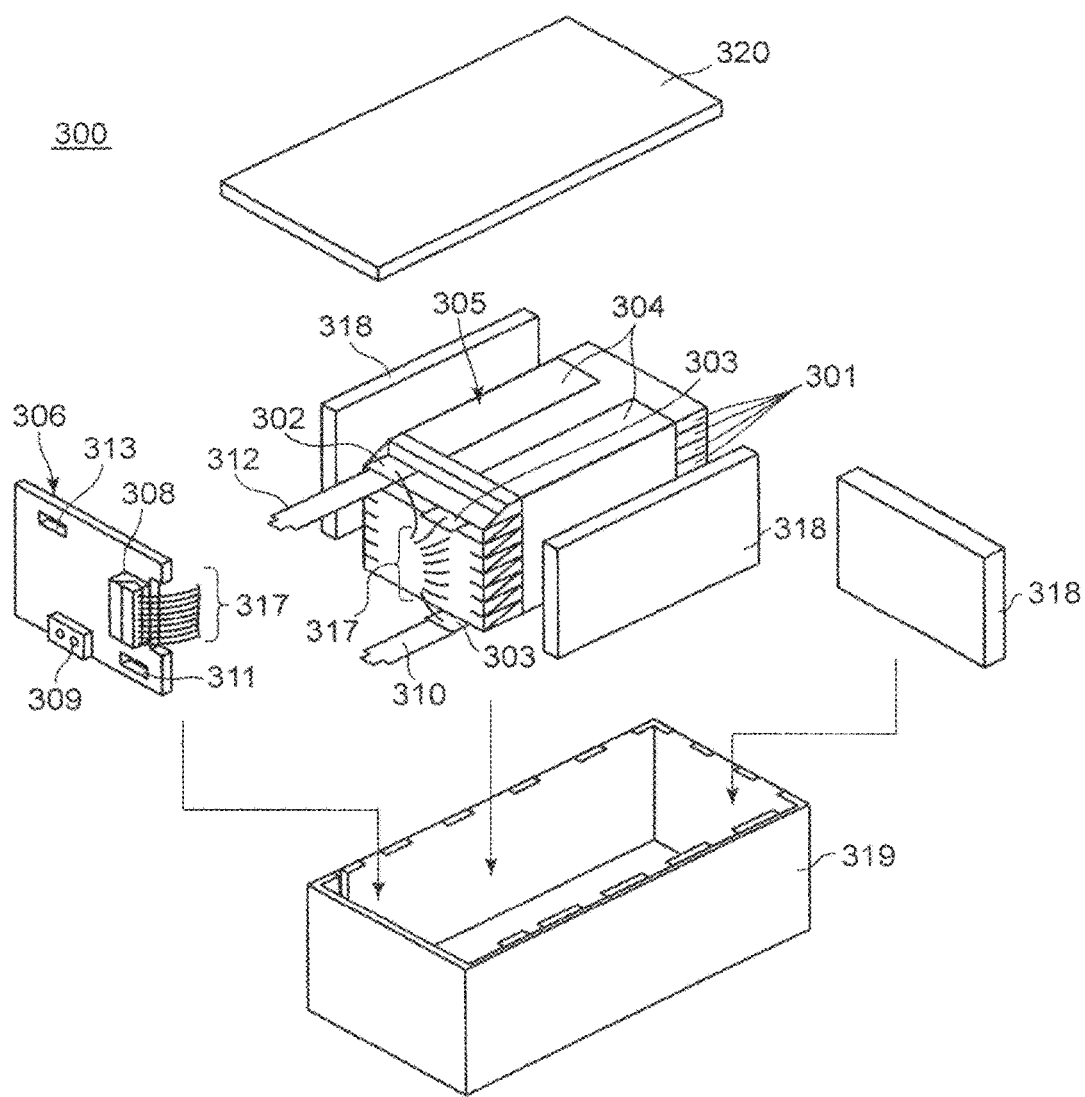
FIG. 6 is a conceptual view of a battery pack of the fourth embodiment.
Figure 7:
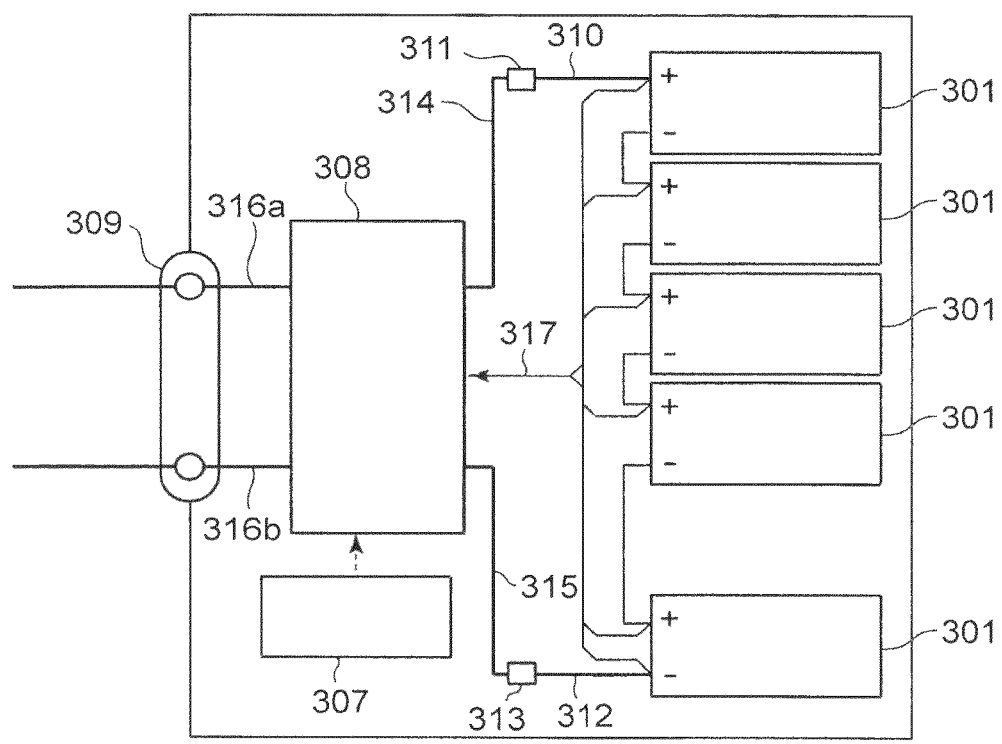
FIG. 7 is a block diagram showing an electric circuit of a battery pack according to the fourth embodiment.

FIG. 6 is a conceptual view of a battery pack of the fourth embodiment, and FIG. 7 is a block diagram showing an electric circuit of a battery pack according to the fourth embodiment. In the battery pack 300 shown in FIG. 6, the flat type nonaqueous electrolyte battery 200 shown in FIG. 4 is used as a single battery 301.

A plurality of single batteries 301 is laminated in such a manner that a negative electrode terminal 302 and a positive electrode terminal 303 each extended to the outside are arranged in the same direction, and the single batteries 301 are fastened together by a pressure sensitive adhesive tape 304 to form an assembled battery 305. These single batteries 301 are mutually electrically connected in series as shown in FIGS. 6 and 7.

A printed wiring board 306 is disposed so as to face a side surface of the single battery 301 from which the negative electrode terminal 302 and the positive electrode terminal 303 are extended. A thermister 307, a protective circuit 308, and a terminal 309 for feeding electricity to an external device are mounted on the printed wiring board 306 as shown in FIG. 7. For avoiding unnecessary connection to the wiring of the assembled battery 305, an insulating plate (not illustrated) is attached on a surface of the printed wiring board 306 which faces the assembled battery 305.

A positive electrode side lead 310 is connected to the positive electrode terminal 303 situated at the lowermost layer of the assembled battery 305, and the tip of the lead is inserted into a positive electrode side connector 311 of the printed wiring board 306 to establish electrical connection. A negative electrode side lead 312 is connected to the negative electrode terminal 302 situated at the uppermost layer of the assembled battery 305, and the tip of the lead is inserted into a negative electrode side connector 313 of the printed wiring board 306 to establish electrical connection. The positive electrode side connector 311 and negative electrode side connector 313 are connected to the protective circuit 308 through wirings 314 and 315 formed on the printed wiring board 306.

The thermister 307 is used for detecting the temperature of the single battery 305. Although not illustrated in FIG. 6, the thermister 307 is provided in the vicinity of the single battery 305, and a detection signal thereof is sent to the protective circuit 308. The protective circuit 308 can cut off positive side wiring 316a and negative side wiring 316b between the protective circuit 308 and the terminal 309 for feeding electricity to an external device upon a predetermined condition. The predetermined condition is that the detection temperature of, for example, the thermister 307 reaches a predetermined temperature or a higher temperature. Further, the predetermined condition is that overcharge, overdischarge, overcurrent or the like of the single battery 301 is detected. The detection of overcharge or the like is performed for each single battery 301 or the whole of single batteries 301. In the case where the detection is performed for each single battery 301, a battery voltage may be detected, or a positive electrode potential or a negative electrode potential may be detected. In the latter case, a lithium electrode to be used as a reference electrode is inserted into each single battery 301. In FIGS. 5 and 6, wiring 317 for voltage detection is connected to each of single batteries 301, and a detection signal is sent to the protective circuit 308 through the wiring 317.

As shown in FIG. 6, a protective sheet 318 made of rubber or resin is disposed on each of three side surfaces of the assembled battery 305, which do not include the side surface from which the positive electrode terminal 303 and the negative electrode terminal 302 protrude.

The assembled battery 305 is stored in a storage container 319 together with the protective sheets 318 and the printed wiring board 306. That is, in the storage container 319, the protective sheet 318 is disposed on each of both inside surfaces in the long side direction and an inside surface in the short side direction, and the printed wiring board 306 is disposed on the opposite inside surface in the short side direction. The assembled battery 305 is situated in a space surrounded by the protective sheets 318 and the printed wiring board 306. A lid 320 is attached on the upper surface of the storage container 319.

For fixation of the assembled battery 305, a heat-shrinkable tape may be used in place of the pressure sensitive adhesive tape 304. In this case, protective sheets are disposed on both side surfaces of the assembled battery, the heat-shrinkable tape is wound around the circumference thereof, and then heat-shrunk to fasten the assembled battery.

FIGS. 6 and 7 show a form in which single batteries 301 are connected in series, but for increasing the battery capacity, singe batteries may be connected in parallel, or series connection and parallel connection may be combined. Assembled battery packs may be further connected in series or in parallel.

According to this embodiment described above, there can be provided a battery pack which includes nonaqueous electrolyte secondary batteries having excellent charge-discharge cycle performance in the third embodiment and thus has excellent charge-discharge cycle performance.

The aspect of the battery pack is appropriately changed according to a use. The use of the battery pack is preferably one in which excellent cycle characteristics are exhibited when a large current is extracted. Specific examples include power source uses in digital cameras, and on-vehicle uses in two to four-wheeled hybrid electric cars, two to four-wheeled electric cars, assisted bicycles and the like. Particularly, a battery pack including nonaqueous electrolyte secondary batteries excellent in high-temperature characteristics is suitable for on-vehicle uses.

Hereinafter, specific examples will be described along with effects thereof.

Example 1

A negative electrode active material of Example 1 was prepared under the following conditions. 1.5 g of a silicon powder (average particle size: 40 nm) was provided as particles containing silicon atoms, 2.5 g of a sucrose powder was added thereto, and dry mixing was performed for 5 minutes using an agate mortar. Next, ethanol was added to the mixed powder using a dropper, and the mixture was kneaded for 30 minutes. The kneaded product thus obtained was put in an aluminum bowl, and then left standing on a hot plate at 150° C. for 1 hour to be dried. The resulting solid was held at 1000° C. for 3 hours under an Ar atmosphere to be heated. The substance after heating was crushed by an agate mortar, and sieved to obtain a negative electrode active material of under 45 micrometers.

(Charge-Discharge Test) 15% by mass of graphite having an average diameter of 3 μm was added to the resulting active material, the mixture was kneaded using N-methylpyrrolidone with 8% by mass of polyimide as a dispersion medium, the mixture was applied onto a 12 μm-thick copper foil, and rolled, and the copper foil was then heat-treated at 250° C. for 2 hours in an Ar gas, cut to a predetermined size, and then dried in vacuum at 100° C. for 12 hours to provide a test electrode. A battery using metal Li as a counter electrode and a reference electrode and an EC.DEC (EC: DEC volume ratio=1:2) solution of $LiPF_6$ (1 M) as an electrolyte solution was produced in an argon atmosphere, and a charge-discharge test was conducted. For conditions of the charge-discharge test, the battery was charged at a current density of 1 $mA/cm^2$ to a potential difference of 0.01 V between the reference electrode and the test electrode, further charged at a constant voltage of 0.01 V for 24 hours, and discharged to 1.5 V at a current density of 1 $mA/cm^2$. Further, a cycle of charging the battery at a current density of 1 $mA/cm^2$ to a potential difference of 0.01 V between the reference electrode and the test electrode, and discharging the battery to 1.5 V at a current density of 1 $mA/cm^2$ was performed, and a change in discharge capacity was measured. The number of cycles in which it was able to keep the discharge capacity at 80% of the initial discharge capacity was defined as a cycle life to make an evaluation.

(Raman Spectroscopic Analysis) Raman spectroscopic analysis was performed for the active material obtained in Example 1. The resulting spectrum is shown in FIG. 2. T-64000 manufactured by Horiba Jobin Yvon Inc was used for measurement. A powder of the active material was placed in a sample chamber, and then measured in a macro-mode with an excitation wavelength of 514.5 nm and a laser power of 10 mW for analysis conditions. The spot diameter of the laser was about 100 μm.

(Observation of Structure of Inside of Active Material and Composition Analysis) For the test electrode obtained in Example 1, the electrode was sliced by an ion milling method, and then observed and analyzed by a TEM-EDX method to confirm that silicon-containing particles existed in the negative electrode active material, and the elemental composition on the periphery thereof was examined to confirm that silicon-containing particles were dispersed in amorphous carbon. The TEM image at this time is shown in FIG. 1. Measurement was performed under conditions of an accelerating voltage of 200 kV and a beam diameter of about 1 nm using H-9000NAR (TEM) manufactured by Hitachi High-Technologies Corporation and HF-2000 (EDX) manufactured by Hitachi High-Technologies Corporation.

For examples and comparative examples below, only apart different from Example 1 is described, and other synthesis and evaluation procedures are not described because they were carried out in the same manner as in Example 1. In all of these examples and comparative examples, it was confirmed that silicon-containing particles were dispersed in amorphous carbon as in Example 1.

Example 2

Except that 2.7 g of an ascorbic acid powder was used in place of the sucrose powder, the same method as in Example 1 was carried out to prepare a negative electrode active material of Example 2.

Example 3

Except that the amount of the sucrose powder used was changed from 2.5 g to 1.9 g, the same method as in Example 1 was carried out to prepare a negative electrode active material of Example 3.

Example 4

Except that heating was performed at 900° C. for 1 hour and 30 minutes instead of performing heating at 1000° C. for 3 hours, the same method as in Example 2 was carried out to prepare a negative electrode active material of Example 4.

Example 5

Except that heating was performed at 900° C. for 3 hours instead of performing heating at 1000° C. for 3 hours, the same method as in Example 2 was carried out to prepare a negative electrode active material of Example 4.

Example 6

Except that heating was performed at 1000° C. for 1 hour and 30 minutes instead of performing heating at 1000° C. for 3 hours, the same method as in Example 2 was carried out to prepare a negative electrode active material of Example 4.

Comparative Example 1

2.5 g of a sucrose powder, 6 g of water and 12 g of ethanol were added to 1.5 g of a silicon powder (average particle size: 40 nm) as particles containing silicon atoms, YSZ balls (0.2 mm) were further added thereto, and the mixture was mixed using a planetary ball mill. 0.5 g of a liquid obtained by mixing hydrochloric acid, water and ethanol in a ratio of 2:2:1 in terms of a mass ratio was added to a liquid separated from YSZ balls by a suction filtration method, and the mixture was stirred, and left standing at room temperature for 1 week to be dried and solidified. The resulting solid was held at 1000° C. for 3 hours under an Ar atmosphere to be heated. The substance after heating was crushed by an agate mortar, and sieved to obtain a negative electrode active material of under 45 micrometers.

Comparative Example 2

2.2 g of furfuryl alcohol and 20 g of ethanol were added to 1.5 g of a silicon powder (average particle size: 40 nm) as particles containing silicon atoms, YSZ (0.2 mm) balls were further added thereto, and the mixture was mixed using a planetary ball mill. A liquid separated from YSZ balls by a suction filtration method was added in an aluminum cup, left standing on a hot plate at 80° C. for 30 minutes, and then left standing on a hot plate at 150° C. for 1 hour to be dried and solidified. The resulting solid was held at 1000° C. for 5 hours under an Ar atmosphere to be heated. The substance after heating was crushed by an agate mortar, and sieved to obtain a negative electrode active material of under 45 micrometers.

Comparative Example 3

Except that the amount of furfuryl alcohol used was changed from 2.2 g to 2.1 g, and the amount of ethanol use was changed from 20 g to 12 g, the same method as in Comparative Example 2 was carried out to prepare a negative electrode active material of Comparative Example 3.

Comparative Example 4

Except that heating was performed at 900° C. for 1 hour instead of performing heating at 1000° C. for 3 hours, the same method as in Example 2 was carried out to prepare a negative electrode active material of Comparative Example 4.

Comparative Example 5

Except that heating was performed at 900° C. for 1 hour instead of performing heating at 1000° C. for 3 hours, the same method as in Comparative Example 2 was carried out to prepare a negative electrode active material of Comparative Example 5.

Comparative Example 6

Except that heating was performed at 950° C. for 3 hours instead of performing heating at 1000° C. for 3 hours, the same method as in Comparative Example 1 was carried out to prepare a negative electrode active material of Comparative Example 6.

The results of argon ion laser Raman spectrum analyses and charge-discharge tests in Examples 1 to 6 and Comparative Examples 1 to 6 are collectively shown in Table 1 above. In Table 1, the half-width of a peak having a maximum intensity in the range of 1575 cm$^{-1}$ or more and 1625 cm$^{-1}$ or less in the argon ion laser Raman spectrum is denoted by ΔG, and the intensity ratio of a peak having a maximum intensity I2 in the range of 500 cm$^{-1}$ or more and 550 cm$^{-1}$ or less to the peak having the maximum intensity I1 in the range of 1575 cm$^{-1}$ or more and 1625 cm$^{-1}$ or less is denoted by I2/I1.

TABLE 1

|  | ΔG | I2/I1 | INITIAL DISCHARGE CAPACITY (mAh/g) | CYCLE LIFE |
|---|---|---|---|---|
| EXAMPLE 1 | 104 | 0.32 | 2276 | 81 |
| EXAMPLE 2 | 113 | 0.28 | 2227 | 95 |
| EXAMPLE 3 | 110 | 0.46 | 2386 | 89 |
| EXAMPLE 4 | 143 | 0.34 | 2201 | 78 |
| EXAMPLE 5 | 134 | 0.33 | 2210 | 79 |
| EXAMPLE 6 | 123 | 0.30 | 2211 | 81 |
| COMPARATIVE EXAMPLE 1 | 109 | 0.21 | 2256 | 54 |
| COMPARATIVE EXAMPLE 2 | 97 | 0.12 | 2193 | 46 |
| COMPARATIVE EXAMPLE 3 | 98 | 0.28 | 2205 | 48 |
| COMPARATIVE EXAMPLE 4 | 152 | 0.30 | 2273 | 39 |
| COMPARATIVE EXAMPLE 5 | 153 | 0.13 | 2292 | 36 |
| COMPARATIVE EXAMPLE 6 | 128 | 0.18 | 2272 | 49 |

In Examples 1 to 6, the half-width ΔG is 100 cm$^{-1}$ or more and 150 cm$^{-1}$ or less. Furthermore, in Examples 1 to 6, the intensity ratio I2/I1 is 0.25 or more and 0.50 or less. The active materials of these examples have a high initial discharge capacity (mAh/g) and a long cycle life. On the other hand, in Comparative Examples 1 and 6, the half-width ΔG is 100 cm$^{-1}$ or more and 150 cm$^{-1}$ or less, but the intensity ratio I2/I1 falls out of the range of 0.25 or more and 0.50 or less. In Comparative Examples 2 and 5, the half-width ΔG falls out of the range of 100 cm$^{-1}$ or more and 150 cm$^{-1}$ or less, and the intensity ratio I2/I1 falls out of the range of 0.25 or more and 0.50 or less. In Comparative Examples 3 and 4, the intensity ratio I2/I1 is in the range of 0.25 or more and 0.50 or less, but the half-width ΔG falls out of the range of 100 cm$^{-1}$ or more and 150 cm$^{-1}$ or less. The active materials of these comparative examples are comparable in initial discharge capacity to those of examples, but inferior in cycle life to those of examples.

The embodiments have been described above, but embodiments are not limited thereto, and can be variously changed in the category of the spirit of the invention described in claims. Further, embodiments can be variously modified without departing the spirit thereof in a practical phase. Further, a plurality of constituent elements disclosed in the above-described embodiments can be appropriately combined to constitute various inventions.

What is claimed is:

1. An active material for a nonaqueous electrolyte battery, comprising a composite comprising:
   a carbonaceous substance; and
   silicon-containing particles dispersed in the carbonaceous substance,
   the silicon-containing particles including at least one of silicon, an alloy containing silicon, and a silicon oxide, wherein
   the composite has an argon ion laser Raman spectrum in which the half-width (ΔG) of a peak having a maximum intensity I1 in the range of 1575 cm$^{-1}$ or more and 1625 cm$^{-1}$ or less is 100 cm$^{-1}$ or more and 150 cm$^{-1}$ or less, and the intensity ratio of a peak having a maximum intensity I2 in the range of 500 cm$^{-1}$ or more and 550 cm$^{-1}$ or less to the peak having the maximum intensity I1 in the range of 1575 cm$^{-1}$ or more and 1625 cm$^{-1}$ or less (I2/I1) is 0.25 or more and 0.50 or less, and
   wherein a peak having the maximum intensity (ID) around 1360 cm$^{-1}$ to the intensity ratio of a peak having the maximum intensity (I1) in the range of 1575 cm$^{-1}$ or more and 1625 cm$^{-1}$ or less is evaluated, an intensity ratio (ID/I1) is in the range of 0.9 or more and 1.1 or less.

2. The active material according to claim 1, wherein the average particle size of the silicon-containing particles is 10 nm or more and 500 nm or less.

3. An electrode for a nonaqueous electrolyte battery comprising:
   a mixture layer containing an active material for a nonaqueous electrolyte battery; and
   a current collector disposed in contact with the mixture layer,
   the active material for a nonaqueous electrolyte battery including a composite including:
   a carbonaceous substance; and
   silicon-containing particles dispersed in the carbonaceous substance,
   the silicon-containing particles including at least one of silicon, an alloy containing silicon, and a silicon oxide, wherein
   the composite has an argon ion laser Raman spectrum in which the half-width (ΔG) of a peak having a maximum intensity I1 in the range of 1575 cm$^{-1}$ or more and 1625 cm$^{-1}$ or less is 100 cm$^{-1}$ or more and 150 cm$^{-1}$ or less, and the intensity ratio of a peak having a maximum intensity I2 in the range of 500 cm$^{-1}$ or more and 550 cm$^{-1}$ or less to the peak having the maximum intensity I1 in the range of 1575 cm$^{-1}$ or more and 1625 cm$^{-1}$ or less (I2/I1) is 0.25 or more and 0.50 or less, and
   wherein a peak having the maximum intensity (ID) around 1360 cm$^{-1}$ to the intensity ratio of a peak having the maximum intensity (I1) in the range of 1575 cm$^{-1}$ or more and 1625 cm$^{-1}$ or less is evaluated, an intensity ratio (ID/I1) is in the range of 0.9 or more and 1.1 or less.

4. The electrode according to claim 3, wherein the average particle size of the silicon-containing particles is 10 nm or more and 500 nm or less.

5. A nonaqueous electrolyte battery comprising:
   an container;
   a positive electrode stored in the container;
   a negative electrode stored so as to be spatially separated from the positive electrode; and
   a nonaqueous electrolyte disposed between the positive electrode and the negative electrode,
   at least one of the positive electrode and negative electrode including:

a mixture layer containing an active material for a nonaqueous electrolyte battery; and a current collector disposed in contact with the mixture layer, the active material for a nonaqueous electrolyte battery including a composite including:

a carbonaceous substance; and silicon-containing particles dispersed in the carbonaceous substance, the silicon-containing particles including at least one of silicon, an alloy containing silicon, and a silicon oxide, wherein the composite has an argon ion laser Raman spectrum in which the half-width (ΔG) of a peak having a maximum intensity I1 in the range of 1575 $cm^{-1}$ or more and 1625 $cm^{-1}$ or less is 100 $cm^{-1}$ or more and 150 $cm^{-1}$ or less, and the intensity ratio of a peak having a maximum intensity I2 in the range of 500 $cm^{-1}$ or more and 550 $cm^{-1}$ or less to the peak having the maximum intensity I1 in the range of 1575 $cm^{-1}$ or more and 1625 $cm^{-1}$ or less (I2/I1) is 0.25 or more and 0.50 or less, and wherein a peak having the maximum intensity (ID) around 1360 $cm^{-1}$ to the intensity ratio of a peak having the maximum intensity (I1) in the range of 1575 $cm^{-1}$ or more and 1625 $cm^{-1}$ or less is evaluated, an intensity ratio (ID/I1) is in the range of 0.9 or more and 1.1 or less.

6. The nonaqueous electrolyte battery according to claim 5, wherein the average particle size of the silicon-containing particles is 10 nm or more and 500 nm or less.

7. A battery pack comprising:

a plurality of nonaqueous electrolyte secondary batteries which is disposed so as to be electrically connected in series, in parallel, or in series and in parallel, the nonaqueous electrolyte secondary battery being an nonaqueous electrolyte battery including:

an container;

a positive electrode stored in the container;

a negative electrode stored so as to be spatially separated from the positive electrode; and a nonaqueous electrolyte disposed between the positive electrode and the negative electrode, at least one of the positive electrode and negative electrode including:

a mixture layer containing an active material for a nonaqueous electrolyte battery; and a current collector disposed in contact with the mixture layer, the active material for a nonaqueous electrolyte battery including a composite including at least:

a carbonaceous substance; and silicon-containing particles dispersed in the carbonaceous substance, the silicon-containing particles including at least one of silicon, an alloy containing silicon, and a silicon oxide, wherein the composite has an argon ion laser Raman spectrum in which the half-width (ΔG) of a peak having a maximum intensity I1 in the range of 1575 $cm^{-1}$ or more and 1625 $cm^{-1}$ or less is 100 $cm^{-1}$ or more and 150 $cm^{-1}$ or less, and the intensity ratio of a peak having a maximum intensity I2 in the range of 500 $cm^{-1}$ or more and 550 $cm^{-1}$ or less to the peak having the maximum intensity I1 in the range of 1575 $cm^{-1}$ or more and 1625 $cm^{-1}$ or less (I2/I1) is 0.25 or more and 0.50 or less, and wherein a peak having the maximum intensity (ID) around 1360 $cm^{-1}$ to the intensity ratio of a peak having the maximum intensity (I1) in the range of 1575 $cm^{-1}$ or more and 1625 $cm^{-1}$ or less is evaluated, an intensity ratio (ID/I1) is in the range of 0.9 or more and 1.1 or less.

8. The battery pack according to claim 7, wherein the average particle size of the silicon-containing particles is 10 nm or more and 500 nm or less.

* * * * *